Patented Nov. 20, 1928.

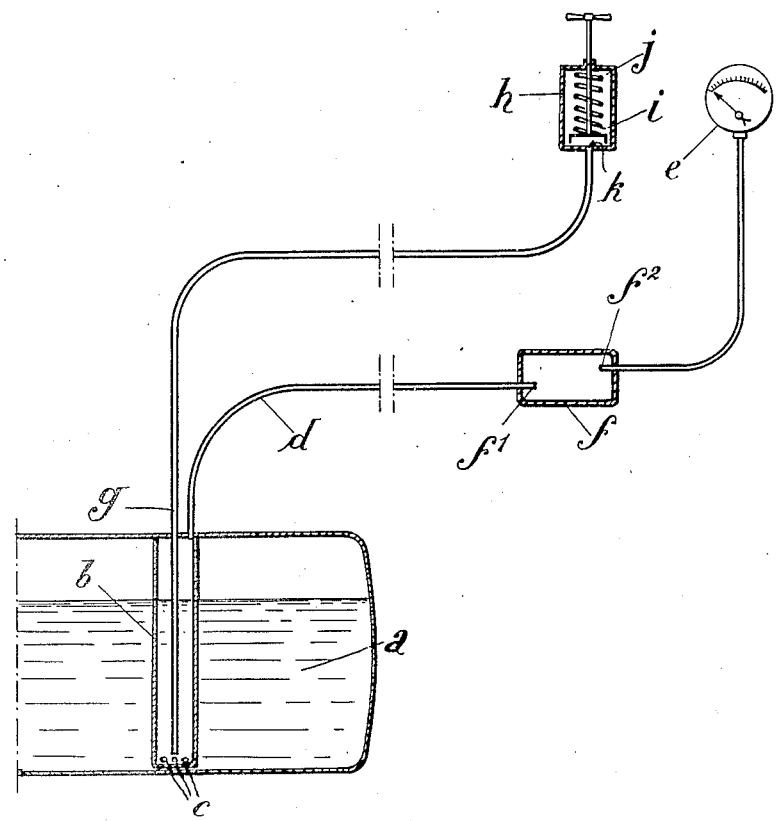

1,692,163

UNITED STATES PATENT OFFICE.

HENRI FARMAN, OF BILLANCOURT, FRANCE.

LIQUID-LEVEL INDICATOR.

Application filed December 15, 1924, Serial No. 756,060, and in France December 29, 1923.

A commonly used device for indicating the level of a liquid at a distance comprises a pressure responsive gage and an air pump arranged the one near the other within the reach of the hand under observation of the driver and connected to the reservoir containing the liquid the level of which has to be indicated.

In apparatus of known construction an indication is obtained by pumping air into the conduit or tube connecting the gage with the reservoir containing the liquid, the level of which is to be indicated. The injection of the air into the connecting tube suddenly influences the gage, thus causing the indicator thereof to give an inaccurate indication. As the pressure responsive gage is a precision apparatus designed to give comparatively accurate indications of the height of a liquid column from 0 to 100 cm., it must be very sensitive so that by sudden variations in pressure to which it is submitted it might be easily rendered inoperative. A further inconvenience of apparatus of known construction is that, owing to the different leakages of the conduit and of the pump, the hand of the pressure responsive gage will slowly move back to zero as soon as the stroke of the pump has taken place and the indication has been given.

This invention has for its object to obviate these inconveniences. With this object in view the pump and the pressure responsive gage are mounted, according to the invention, on the end of two tubes having each a capillary bore, which are connected with one another by means of a closed tube arranged in the reservoir to be gauged, this closed tube forming an air dash pot as it contains always, after the stroke of the pump, a quantity of air which holds the level of the liquid in this closed tube at the lower end of the capillary bore coming from the pump, the contact pressure of this air—corresponding to the height of liquid in the reservoir—acting upon the pressure responsive gage which gives thus accurate and stable indications relating to the height of this level in the reservoir.

An embodiment of the invention is diagrammatically illustrated, by way of example, in the only figure of the accompanying drawing.

Referring to the diagram $a$ is a reservoir containing the liquid to be gauged. In this reservoir $a$ closed tube $b$ is arranged which has in its lower end narrow openings $c$ and the upper part of which communicates by a conduit $d$ having a capillary bore with a pressure responsive gage. In this conduit $d$ an air reservoir $f$ is inserted between the ends $f^2$ and $f^1$ of the capillary bore in conduit $d$. A conduit $g$ having a capillary bore connects an air pump $h$ with the closed tube $b$ and this conduit $g$ terminates close to the openings $c$ in the closed tube. The piston $i$ of the air pump is controlled by a spring $j$. The mouth $k$ of the capillary bore of conduit $g$ is located in the bottom plate of the air pump.

The operation is as follows:—

Suppose the level of the liquid to be gauged is at the same height in the reservoir $a$ and in the closed tube $b$, the spring $j$ will be compressed when the piston $i$ is being lifted and the body of the pump $h$ fills with air which flows in, not through the mouth of the capillary bore $k$, which offers too much resistance, but at the sides of the piston $i$ which are made of pressed leather. The said piston $i$, when released, descends under the action of the spring $j$ and sends an air charge, through the conduit $g$, into the lower part of the closed tube $b$. This air rises in said closed tube and forces the liquid into the reservoir through the openings $c$, producing in the upper hermetically closed part of the closed tube $b$ a pressure which is always equal to the difference of the liquid level in the reservoir and in the closed tube.

This pressure, which reaches the maximum when the air forced in by pump $h$ begins to flow out of the closed tube $b$ through the openings $c$, is transmitted to the pressure responsive gage $e$ which indicates the height of the corresponding liquid level.

The small air reservoir $f$ of any known type, in the capillary bore of the conduit $d$ serves to regulate the excessive pressures resulting from the oscillations of the liquid in the reservoir.

In a device of this type, the pressure responsive gage $e$ is therefore separated from the pump $h$ by the long conduits $d$ and $e$. Further the pressures, before arriving in the pressure responsive gage $e$, must pass through several capillary conduits and through a closed tube in which the air volume varies not. It will therefore be protected against the sudden shocks originating from the pump.

On the other hand, the stabilization of the pressure responsive gage is obtained by the fact that, if there is any leakage in the pump, the liquid will rise in the conduit $g$ until the equilibrium of the levels is established, but it could never rise in the annular space of the closed tube $b$ higher than the lower orifice of the conduit $g$. This annular space of the closed tube will therefore remain filled with air at the pressure produced by the height of the liquid column. Even if one supposes that the pump be suppressed and the conduit $g$ open to the atmosphere, the pressure responsive gage will always indicate the same level and will thus be stabilized.

I claim:

An apparatus designed to indicate at a distance the position of the level of a liquid comprising in combination with a reservoir containing the liquid, an air pump, a pressure responsive gage, a tube, closed at each end, extending downwardly in said reservoir to adjacent the bottom thereof and provided with openings in its side walls near the lower end thereof for communication with the liquid in said reservoir at the minimum level to be gaged, a tubular conduit of capillary bore, connected at one end to said pump and extending downwardly in said tube and terminating a short distance above the bottom thereof, and a second conduit having a capillary bore and connecting the top end of said closed tube with said pressure responsive gage.

In testimony whereof I affix my signature.

HENRI FARMAN.